United States Patent
Itzhaky et al.

(10) Patent No.: US 10,262,407 B2
(45) Date of Patent: Apr. 16, 2019

(54) SYSTEM AND METHOD FOR EFFICIENT IDENTIFICATION OF DEVELOPMENTAL ANOMALIES

(71) Applicant: Prospera Technologies, Ltd., Tel-Aviv (IL)

(72) Inventors: Raviv Itzhaky, Maale Adumim (IL); Daniel Koppel, Raanana (IL); Simeon Shpiz, Bat Yam (IL)

(73) Assignee: Prospera Technologies, Ltd., Tel-Aviv (IL)

( * ) Notice: Subject to any disclaimer, the term of this patent is extended or adjusted under 35 U.S.C. 154(b) by 0 days.

(21) Appl. No.: 15/440,767

(22) Filed: Feb. 23, 2017

(65) Prior Publication Data

US 2017/0249733 A1     Aug. 31, 2017

Related U.S. Application Data

(60) Provisional application No. 62/299,605, filed on Feb. 25, 2016.

(51) Int. Cl.
| | |
|---|---|
| *G06T 7/00* | (2017.01) |
| *G06K 9/00* | (2006.01) |
| *G06K 9/46* | (2006.01) |
| *G06K 9/62* | (2006.01) |

(52) U.S. Cl.
CPC ........ *G06T 7/0004* (2013.01); *G06K 9/00657* (2013.01); *G06K 9/4652* (2013.01); *G06K 9/6201* (2013.01); *G06T 2207/10141* (2013.01); *G06T 2207/30128* (2013.01)

(58) Field of Classification Search
CPC ........ G06T 2207/30128; G06T 7/0004; G06K 9/6202; G06K 9/00657
See application file for complete search history.

(56) References Cited

U.S. PATENT DOCUMENTS

| | | |
|---|---|---|
| 5,841,883 A | 11/1998 | Kono et al. |
| 6,014,451 A | 1/2000 | Berry et al. |
| 7,765,780 B2 | 8/2010 | Koselka et al. |
| 7,987,632 B2 | 8/2011 | May et al. |
| 8,923,569 B2 | 12/2014 | Duarte |

(Continued)

FOREIGN PATENT DOCUMENTS

WO     1999021118 A1     4/1999

Primary Examiner — Ping Y Hsieh
(74) Attorney, Agent, or Firm — M&B IP Analysts, LLC

(57) ABSTRACT

A system and method for identifying developmental anomalies. The method includes obtaining a first set of at least one multimedia content element showing at least one crop and captured using a first set of at least one capturing parameter; obtaining normal development data for the at least one crop, wherein the normal development data represents at least one normal development characteristic of the at least one crop; analyzing, via machine vision, the first set of at least one multimedia content element to identify a first set of at least one characteristic of the at least one crop; determining, based on the first set of at least one characteristic and the normal development data, whether a suspected anomaly is identified; and verifying if the suspected anomaly is an anomaly using a second set of at least one multimedia content element captured using a second set of at least one capturing parameter.

17 Claims, 2 Drawing Sheets

(56) References Cited

U.S. PATENT DOCUMENTS

| | | | | |
|---|---|---|---|---|
| 2001/0036295 | A1* | 11/2001 | Hendrickson | G01J 3/2803 |
| | | | | 382/110 |
| 2006/0290933 | A1 | 12/2006 | Holm | |
| 2013/0044919 | A1* | 2/2013 | Purcell | G01N 21/25 |
| | | | | 382/110 |
| 2013/0325346 | A1 | 12/2013 | McPeek | |
| 2014/0312165 | A1* | 10/2014 | Mkrtchyan | B64D 47/08 |
| | | | | 244/13 |
| 2016/0050840 | A1* | 2/2016 | Sauder | A01B 79/005 |
| | | | | 701/3 |
| 2016/0223506 | A1* | 8/2016 | Shriver | G01N 33/0098 |
| 2017/0145807 | A1* | 5/2017 | Wendorf | E21B 47/0002 |
| 2017/0215447 | A1* | 8/2017 | Thorsen | A23C 3/037 |

\* cited by examiner

SYSTEM AND METHOD FOR EFFICIENT IDENTIFICATION OF DEVELOPMENTAL ANOMALIES

CROSS-REFERENCE TO RELATED APPLICATIONS

This application claims the benefit of U.S. Provisional Application No. 62/299,605 filed on Feb. 25, 2016, the contents of which are hereby incorporated by reference.

TECHNICAL FIELD

The present disclosure relates generally to monitoring systems, and more specifically to monitoring systems configured to identify anomalies from normal growth patterns of crops such as plants.

BACKGROUND

Despite the rapid growth of the use of technology in many industries, agriculture continues to utilize manual labor to perform the tedious and often costly processes for growing vegetables, fruits, and other crops. One primary driver of the continued use of manual labor in agriculture is the need for guidance and consultation by experienced agronomists with respect to developing plants. Such guidance and consultation is crucial to the success of larger farms.

Agronomy is the science of producing and using plants for food, fuel, fiber, and land reclamation. Agronomy involves use of principles from a variety of arts including, for example, biology, chemistry, economics, ecology, earth science, and genetics. Modern agronomists are involved in issues such as improving quantity and quality of food production, managing the environmental impacts of agriculture, extracting energy from plants, and so on. Agronomists often specialize in areas such as crop rotation, irrigation and drainage, plant breeding, plant physiology, soil classification, soil fertility, weed control, and pest control.

The plethora of duties assumed by agronomists require critical thinking to solve problems. For example, when planning to improve crop yields, an agronomist must study a farm's crop production in order to discern the best ways to plant, harvest, and cultivate the plants, regardless of climate. Additionally, agronomists may identify and address anomalies from normal growth patterns to ensure proper development. To these ends, the agronomist must continually monitor progress to ensure optimal results. For example, an agronomist may look for indicators developmental anomalies of such as disease (e.g., rings or fungi indicative of blight), pest infestation (e.g., abnormal holes in plants indicative that insects or rodents are eating portions of the plants), poor growth (e.g., smaller size of plants or numbers of fruit), and the like.

Reliance on manual observation of plants is time-consuming, expensive, and subject to human error. As a result, some existing solutions for automatic plant monitoring have been developed. Some existing solutions utilize machine vision to analyze multimedia, and may capture the multimedia via drones and other vehicles equipped with capturing devices. Such existing solutions typically obtain images from a wide upper angle of the examined environment (e.g., fields, orchards, etc.), in which the monitored plants are growing.

Existing solutions for plant monitoring face challenges in efficiently and accurately identifying anomalies and, consequently, cases in which external intervention may be required. More specifically, especially when implemented in larger farm areas, such solutions face significant challenges, even prior to determining appropriate responses to developmental issues, in identifying early signs and symptoms of anomalies.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for identifying developmental anomalies. The method comprises: obtaining a first set of at least one multimedia content element showing at least one crop, wherein the first set of at least one multimedia content element is captured using a first set of at least one capturing parameter; obtaining normal development data for the at least one crop, wherein the normal development data represents at least one normal development characteristic of the at least one crop; analyzing, via machine vision, the first set of at least one multimedia content element to identify a first set of at least one characteristic of the at least one crop; determining, based on the first set of at least one characteristic and the normal development data, whether a suspected anomaly is identified, wherein the suspected anomaly is identified when the first set of at least one characteristic deviates from the normal development data; and verifying if the suspected anomaly is an anomaly in development of the at least one crop using a second set of at least one multimedia content element, wherein the second set of at least one multimedia content element is captured using a second set of at least one capturing parameter.

Certain embodiments disclosed herein also include a non-transitory computer readable medium having stored thereon instructions for causing a processing circuitry to execute a process, the process comprising: obtaining a first set of at least one multimedia content element showing at least one crop, wherein the first set of at least one multimedia content element is captured using a first set of at least one capturing parameter; obtaining normal development data for the at least one crop, wherein the normal development data represents at least one normal development characteristic of the at least one crop; analyzing, via machine vision, the first set of at least one multimedia content element to identify a first set of at least one characteristic of the at least one crop; determining, based on the first set of at least one characteristic and the normal development data, whether a suspected anomaly is identified, wherein the suspected anomaly is identified when the first set of at least one characteristic deviates from the normal development data; and verifying if the suspected anomaly is an anomaly in development of the at least one crop using a second set of at least one multimedia content element, wherein the second set of at least one multimedia content element is captured using a second set of at least one capturing parameter.

Certain embodiments disclosed herein also include a system for identifying developmental anomalies. The system comprises: a processing circuitry; and a memory, the memory containing instructions that, when executed by the processing circuitry, configure the system to: obtain a first set of at least one multimedia content element showing at least one crop, wherein the first set of at least one multimedia content element is captured using a first set of at least one capturing parameter; obtain normal development data for the at least one crop, wherein the normal development data represents at least one normal development characteristic of the at least one crop; analyze, via machine vision, the first set of at least one multimedia content element to identify a first set of at least one characteristic of the at least one crop; determine, based on the first set of at least one characteristic and the normal development data, whether a suspected anomaly is identified, wherein the suspected anomaly is identified when the first set of at least one characteristic deviates from the normal development data; and verify if the suspected anomaly is an anomaly in development of the at least one crop using a second set of at least one multimedia content element, wherein the second set of at least one multimedia content element is captured using a second set of at least one capturing parameter.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
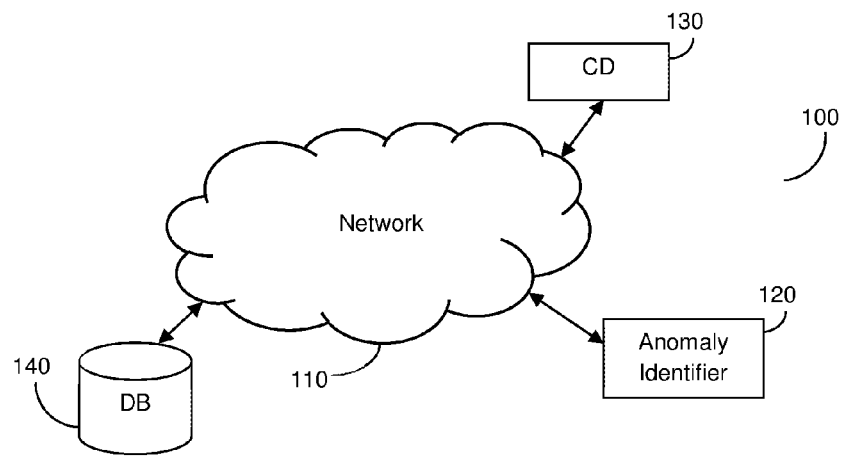
FIG. 1 is a network diagram utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for efficiently identifying developmental anomalies in crops such as, e.g., plants. The identified anomalies may represent deviations from normal growth patterns of the crops. Various embodiments disclosed herein may result in rapid and accurate identification of anomalies. Further, such embodiments may result in reduced use of computing resources (e.g., computing resources utilized for monitoring of crops).

In an embodiment, normal development data for at least one crop (e.g., one or more plants) is obtained. The normal development data represents at least one normal development characteristic for the at least one crop. A first set of at least one multimedia content element captured using a first set of at least one capturing parameter and showing the at least one crop are obtained. The first set of at least one multimedia content element is analyzed to identify a first set of at least one characteristic of the at least one crop. Based on the first set of at least one crop characteristic and the normal development data, it is determined if the first set of at least one crop characteristic deviates from the normal development data and, therefore, if a suspected anomaly is identified. If a suspected anomaly is identified, the suspected anomaly may be verified to determine if it is an anomaly in development of the at least one crop based on a second set of at least one multimedia content element captured using a second set of at least one capturing parameter and showing the at least one crop.

In an embodiment, the second set of at least one multimedia content element is obtained. The second set of at least one multimedia content element may be captured at, for example, a different distance, a different angle, a different focus, a different resolution, or a combination thereof, as compared to the first set of at least one multimedia content element. The second set of at least one multimedia content element is analyzed to identify a second set of at least one characteristic of the at least one crop. Based on the second set of at least one crop characteristic and the normal development data, it is determined whether the second set of at least one crop characteristic deviates from the normal development data and, therefore, whether development of the crop is anomalous.

FIG. 1 shows an example network diagram 100 utilized to describe the various disclosed embodiments. The network diagram 100 includes an anomaly identifier 120, a capturing device 130, and a database 140 communicatively connected via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

The capturing device 130 is located in proximity (e.g., physical proximity, such as within a predetermined distance) to at least one crop. The capturing device 130 may be stationary or mobile, and is configured to capture multimedia content elements showing the at least one crop. Each multimedia content element may be an image, a video, or any other visual depiction of the target area. The capturing device 130 may be, but is not limited to, a still camera, a red-green-blue (RGB) camera, a red-green-blue-near infrared (RGBN) camera, a shortwave infrared (SWIR) camera, a thermal imaging radar (TIR) camera, a multi spectral camera, a hyper spectral camera, a video camera, and the like. The capturing device 130 may be operated using electricity, solar energy, other forms of energy, or a combination thereof. In some implementations, the capturing device 130 may be assembled on a stationary unit (e.g., a pole, a rafter, etc.) or a mobile unit (e.g., a drone, a patrolling vehicle, a satellite, etc.).

The database 140 may store data such as, but not limited to, multimedia content elements captured by the capturing device 130, normal development data representing normal development characteristics and conditions, sets of capturing parameters and associated crop types and characteristics, or a combination thereof. The normal development data may include, but is not limited to, one or more multimedia content elements showing normal stages of development of a crop, one or more normal development rules, a combination thereof, and the like. The normal development data may include different sets of data for different crops (e.g., for different species of plants). The normal development data may be further based on time of development such that the normal development data differs for each type of crop depending on the stage of crop development (e.g., based on the time since the crop was planted). As a non-limiting example, normal development data for a particular species of tomato vine may include green color fruit at a stage between around 20-60 days since germination and red fruit at a stage after around 60 days since germination.

In an embodiment, the anomaly identifier 120 may be configured to retrieve normal development data from the database 140. The normal development data represents typical or otherwise expected development characteristics of the crop during at various stages in a life cycle of the crop (e.g., as represented by periods of time with respect to planting or germination). In a further embodiment, the retrieval may be based on a type of the at least one crop. The normal development data may include one or more normal development rules defining normal development characteristics such as, but not limited to, typical colors (e.g., of leaves, stems, fruit, bark, etc.), shapes, sizes, growth patterns, chlorophyll colors, and the like. Alternatively or collectively, the normal development data may include normal development multimedia content elements showing normally developing plants at various stages in the plant life cycle.

The capturing device 130 may be configured to monitor the at least one crop. The monitoring may include, but is not limited to, capturing multimedia content elements showing the at least one crop, moving the capturing device 130 (e.g., such that the capturing device 130 roams around a farm area, thereby allowing for monitoring different groups of crops), storing the captured multimedia content elements (e.g., in the database 140), and the like. In an embodiment, the anomaly identifier 120 may be configured to cause the capturing device 130 to monitor the at least one crop.

In an embodiment, the anomaly identifier 120 is configured to obtain a first set of at least one multimedia content element captured by the capturing device 130 and showing the at least one crop (or a subset thereof). In a further embodiment, the anomaly identifier 120 may be configured to receive the first set from the capturing device 130 or to retrieve the first set from the database 140. The first set may be captured based on a first set of at least one capturing parameter. The at least one capturing parameter may include, but is not limited to, a distance from the at least one crop, an angle with respect to the at least one crop, a focus, a resolution, a combination thereof, and the like. In another embodiment, the anomaly identifier 120 may be configured to cause the capturing device 130 to capture the first set of at least one multimedia content element. In a further embodiment, the anomaly identifier 120 may be configured to send the first set of at least one capturing parameter to the capturing device 130, thereby triggering the capturing device 130 to capture the first set of at least one multimedia content element based on the first set of at least one capturing parameter.

In yet a further embodiment, the first set of at least one capturing parameter may be determined based on a type of the crop (e.g., an optimal first distance and first angle for capturing images of an apple tree may be different from an optimal distance and angle for capturing images of a watermelon patch), one or more characteristics of the crop (e.g., height), both, and the like. To this end, each capturing parameter of the first set of at least one capturing parameter may be a predetermined parameter associated with one or more of the crop type, the crop characteristics, and the like. Thus, in a further embodiment, the anomaly identifier 120 may be configured to retrieve the first set of at least one capturing parameter from, e.g., the database 140.

In an embodiment, the anomaly identifier 120 is configured to analyze the first set to identify a first set of at least one characteristic of the at least one crop. The at least one characteristic may include, but is not limited to, color, shape, size, presence of holes, appearance of pests, and the like. The analysis may include, but is not limited to, machine vision analysis of each multimedia content element of the first set. In a further embodiment, the analysis may further include comparing the first set to one or more predetermined multimedia content elements.

In an embodiment, based on the identified first set of at least one characteristic and the normal development data, the anomaly identifier 120 may be configured to determine whether a suspected anomaly is identified. The suspected anomaly may be identified based on a deviation of the identified first set of characteristics from the normal development data. In a further embodiment, the suspected anomaly may be identified when one or more of the identified first set of characteristics differs from one or more of the normal development characteristics above a predetermined threshold. In yet a further embodiment, determining whether a suspected anomaly is identified may be based on the one or more normal development rules. The normal development rules may indicate, e.g., characteristics of a plant associated with normal development (e.g., size, shape, color, texture, etc.), threshold values for plant characteristics (e.g., a range of normal color values may be defined via high and low threshold values representing distinct colors), and the like. As a non-limiting example, for a tree that normally bears yellow fruits, a suspected anomaly may be identified when black fruits are shown in the first set of at least one multimedia content element.

In another embodiment, determining whether a suspected anomaly is identified may include comparing the one or more normal development multimedia content elements to multimedia content elements of the first set. In a further embodiment, comparison may be with respect to the identified first set of at least one characteristic. In yet a further embodiment, a deviation may be determined when the multimedia content elements of the first set differ from the normal development multimedia content elements above a predetermined threshold.

In an embodiment, when it is determined that a suspected anomaly is identified, the anomaly identifier 120 is configured to verify whether the suspected anomaly is an anomaly in development of the at least one crop based on a second set of at least one multimedia content element captured using a second set of at least one capturing parameter. To this end, in a further embodiment, the anomaly identifier 120 is configured to obtain the second set of at least one multimedia content element captured by the capturing device 130 and showing the at least one crop (or a subset thereof). In yet a further embodiment, the anomaly identifier 120 may be configured to receive the second set from the capturing device 130 or to retrieve the second set from the database 140. The second set of at least one capturing parameter may be utilized to provide a clearer view of the at least one crop than the first set of at least one capturing parameter. To this end, the second set of at least one capturing parameter may include, but is not limited to, a shorter distance, a different angle, a higher focus, a higher resolution, a combination thereof, and the like.

In another embodiment, the anomaly identifier 120 may be configured to determine the second set of at least one capturing parameter based on, e.g., the first set of at least one multimedia content element. In yet a further embodiment, the second set of at least one capturing parameter may be determined based on a type of the crop, one or more characteristics of the crop, both, and the like. To this end, each capturing parameter of the second set of at least one capturing parameter may be a predetermined parameter associated with one or more of the crop type, the crop characteristics, and the like.

In an embodiment, the anomaly identifier 120 may be configured to cause the capturing device 130 to capture the second set of at least one multimedia content element. In a further embodiment, the anomaly identifier 120 may be configured to send the second set of at least one capturing parameter to the capturing device 130, thereby triggering the capturing device 130 to capture the second set of at least one multimedia content element based on the second set of at least one capturing parameter.

In an embodiment, the anomaly identifier 120 is configured to analyze the second set of at least one multimedia content element to identify a second set of at least one characteristic of the at least one crop. The analysis may include, but is not limited to, machine vision analysis of each multimedia content element of the first set. In a further embodiment, the analysis may further include comparing the first set of at least one multimedia content elements to one or more of the normal development multimedia content elements.

In an embodiment, based on the second set of at least one characteristic and the normal development data, the anomaly identifier 120 may be configured to determine whether development of the at least one crop is anomalous. Development of the at least one crop may be determined to be anomalous a deviation of the identified second set of characteristics from the normal development data is identified. In a further embodiment, the deviation may be identified when one or more of the identified second set of characteristics differs from one or more of the normal development characteristics above a predetermined threshold. In yet a further embodiment, determining whether a suspected anomaly is identified may be based on the one or more normal development rules. The normal development rules may indicate, e.g., characteristics of a plant associated with normal development (e.g., size, shape, color, texture, etc.), threshold values for plant characteristics (e.g., a range of normal color values may be defined via high and low threshold values representing distinct colors), and the like.

In another embodiment, determining whether anomaly deviation is identified may include comparing one or more multimedia content elements showing normal stages of development of the at least one plant to multimedia content elements of the second set. In a further embodiment, the comparison may be with respect to the identified first set of at least one characteristic. In yet a further embodiment, a deviation may be determined when the multimedia content elements of the first set differ from the normal development multimedia content elements above a predetermined threshold.

Figure 2:
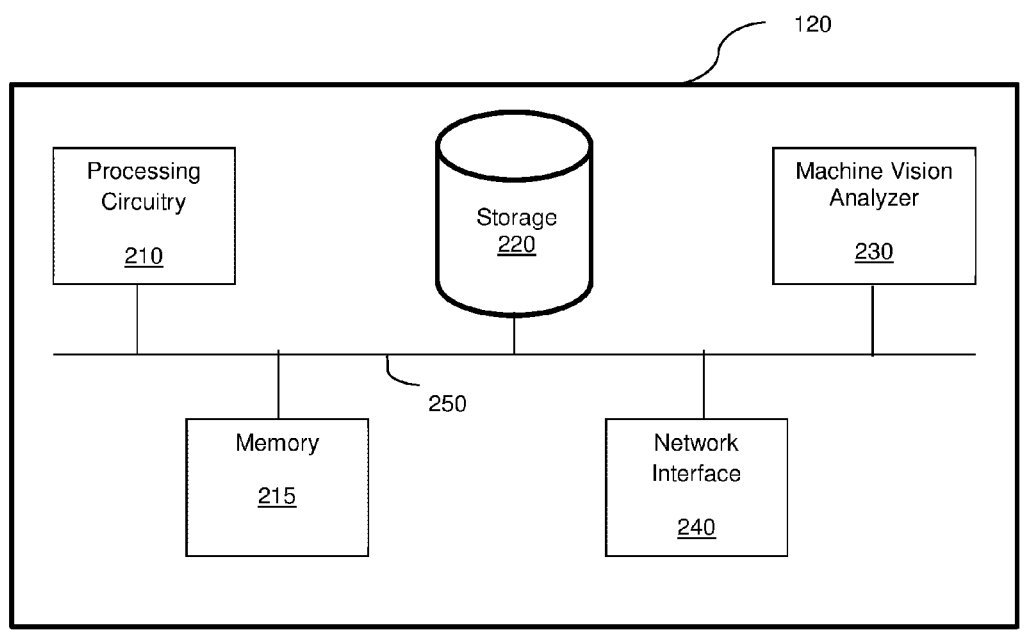
FIG. 2 is a schematic diagram of an anomaly identifier according to an embodiment.

FIG. 2 shows an example schematic diagram illustrating an anomaly identifier 120 according to an embodiment. The anomaly identifier 120 includes a processing circuitry 210 coupled to a memory 215, a storage 220, a machine vision analyzer 230, and a network interface 240. In an embodiment, the components of the anomaly identifier 120 may be communicatively connected via a bus 250.

The processing circuitry 210 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 215 may be volatile (e.g., RAM, etc.), non-volatile (e.g., ROM, flash memory, etc.), or a combination thereof. In one configuration, computer readable instructions to implement one or more embodiments disclosed herein may be stored in the storage 220.

In another embodiment, the memory 215 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 210 to perform the various processes described herein. Specifically, the instructions, when executed, cause the processing circuitry 210 to perform efficient identification of developmental anomalies, as discussed herein.

The storage 220 may be magnetic storage, optical storage, and the like, and may be realized, for example, as flash memory or other memory technology, CD-ROM, Digital Versatile Disks (DVDs), or any other medium which can be used to store the desired information.

The machine vision analyzer 230 is configured to analyze multimedia content elements via machine vision. The analysis may result in identification of crop characteristics of crops shown in the multimedia content elements such as, but not limited to, size, shape, texture, color, and the like.

The network interface 240 allows the color analyzer 130 to communicate with the capturing device 130, the database 140, or a combination thereof, for the purpose of, for example, causing capturing of multimedia content elements, retrieving normal development data, and the like.

It should be understood that the embodiments described herein are not limited to the specific architecture illustrated in FIG. 2, and other architectures may be equally used without departing from the scope of the disclosed embodiments.

Figure 3:
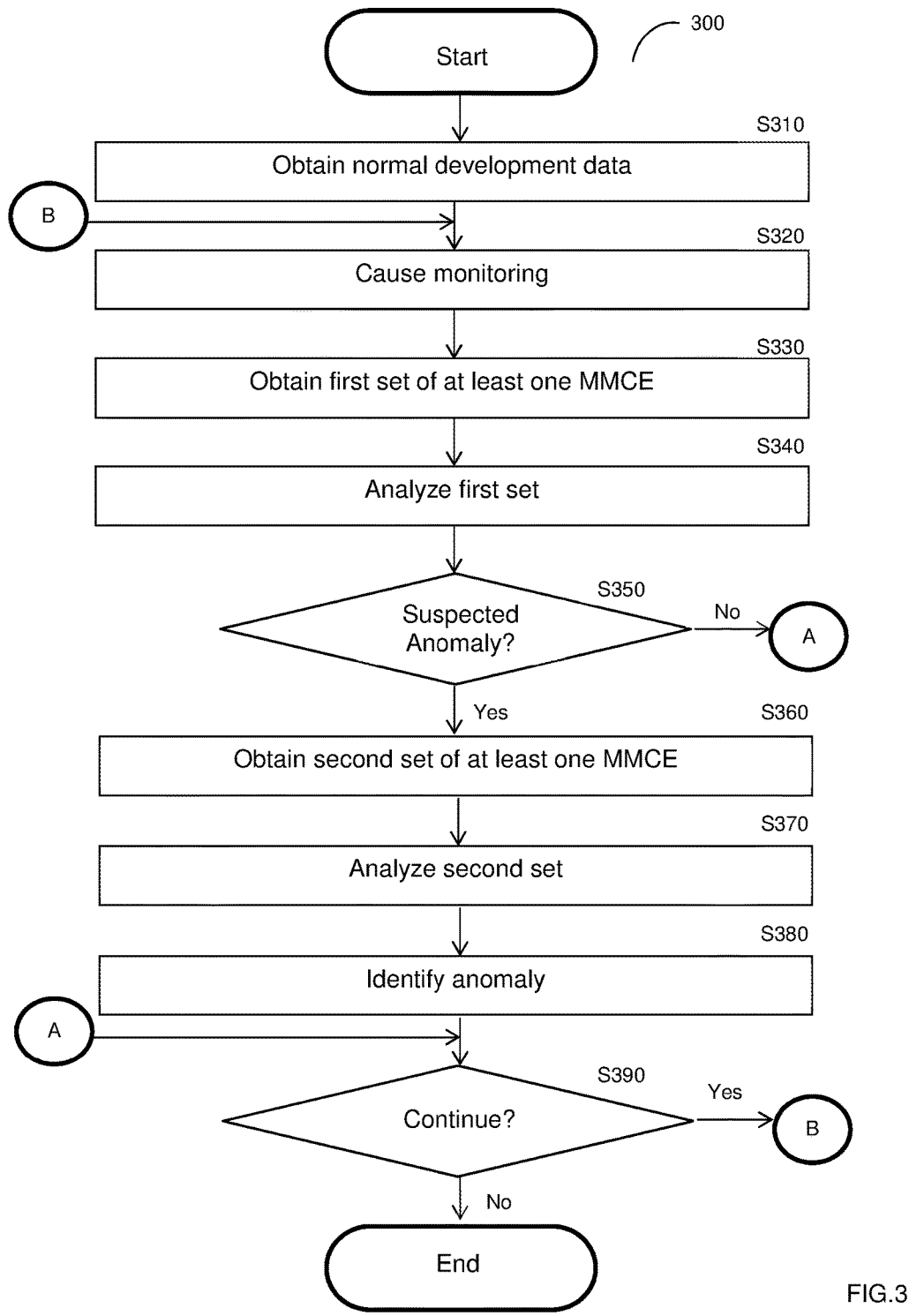
FIG. 3 is a flowchart illustrating a method for efficiently identifying developmental anomalies according to an embodiment.

FIG. 3 is an example flowchart 300 illustrating a method for efficiently identifying developmental anomalies according to an embodiment. In an embodiment, the method may be performed by the anomaly identifier 120 based on multimedia content elements captured by the capturing device 130, FIG. 1. In another embodiment, the developmental anomalies may be identified for monitored crops such as, but not limited to, plants.

At S310, normal development data related to at least one crop is obtained. The normal development data may be received, or may be retrieved from, e.g., a data source including developmental data for one or more plants. In an embodiment, S310 may include determining a type of the at least one crop (e.g., corn stalks, tomato vines, apple tree, etc.) and obtaining the normal development data with respect to the determined type of crop. The type of crop may be provided (e.g., by a farmer via a user device), or may be determined based on, e.g., machine vision analysis of a multimedia content element showing the at least one crop. The normal development data represents at least one normal development characteristic for the type of the at least one crop and may include, but is not limited to, normal development multimedia content elements showing plants developing normally, one or more normal development rules defining normal plant characteristics, or both. The normal development rules may include threshold values such that, e.g., deviations from normal development behavior may be identified when values representing characteristics of the at least one crop do not meet the threshold values.

At optional S320, a capturing device is caused to monitor the at least one crop. The monitoring may include, but is not limited to, capturing multimedia content elements showing the at least one crop or a subset thereof, moving with respect to the at least one crop, or both.

At S330, a first set of at least one multimedia content element is obtained. The obtained first set of at least one multimedia content element may be received from a capturing device (e.g., the capturing device monitoring the at least one plant), retrieved (e.g., from a data source), and the like.

In an embodiment, S330 includes causing the capturing device to capture the first set of at least one multimedia content element. Each multimedia content element may be, but is not limited to, an image or a video, and shows the at least one crop or a portion thereof. In an embodiment, the first set of at least one multimedia content element may be captured based on a first set of capturing parameter. The first set of at least one capturing parameter may include, but is not limited to, a first distance with respect to the at least one crop (e.g., 100 feet above the at least one crop), a first angle with respect to the at least one crop, a first focus (e.g., 100% zoom), a first resolution (e.g., 1 MP), a first number of multimedia content elements to be captured (e.g., 1 multimedia content element), a first type of multimedia content element to be captured (e.g., an image or a video), or a combination thereof. The first set of at least one capturing parameter may include a respective subset of capturing parameters for each of at least two capturing devices (e.g., two cameras may be configured to capture images at different angles with respect to the at least one plant).

In an embodiment, S330 further includes sending, to the capturing device, the first set of at least one capturing parameter, thereby triggering the capturing device to capture the first set of at least one multimedia content element using the first set of at least one capturing parameter. The capturing device may be configured to store the captured first set of at least one multimedia content element in a data source. In a further embodiment, S330 includes determining the first set of at least one capturing parameter based on a type of the crop, one or more characteristics of the crop (e.g., height), both, and the like. To this end, each capturing parameter of the first set of at least one capturing parameter may be a predetermined parameter associated with the crop type, the crop characteristics, or a combination thereof.

At S340, the first set of at least one multimedia content element is analyzed with respect to the normal development data. In an embodiment, S340 includes analyzing, via machine vision, each multimedia content element of the first set to identify a first set of at least one characteristic of the at least one crop and comparing the identified first set of at least one characteristic with the normal development data. In a further embodiment, the comparison may be further based on times of capture of each multimedia content element and times associated with the normal development data. As a non-limiting example, a multimedia content element captured one week after planting of the at least one plant may be analyzed, and the results of the analysis may be compared to normal development data indicating normal characteristics of the at least one plant one week into development.

At S350, based on the analysis of the first set, it is determined if a suspected anomaly is identified and, if so, execution continues with S360; otherwise, execution continues with S390. In an embodiment, a suspected anomaly is identified if the first set of at least one characteristic deviates from the normal development data. In a further embodiment, the first set of at least one characteristic may deviate from the normal development if, e.g., one or more characteristics of the first set of at least one characteristic are not within the predetermined normal thresholds, or if the first set of at least one characteristic otherwise differs from the normal development data above a predetermined threshold.

At S360, a second set of at least one multimedia content element is obtained. The obtained second set of at least one multimedia content element may be received from the capturing device, retrieved (e.g., from a data source), and the like.

In an embodiment, S360 includes causing the capturing device to capture the second set of at least one multimedia content element. Each multimedia content element may be, but is not limited to, an image or a video, and shows the at least one crop or a portion thereof. In an embodiment, the second set of at least one multimedia content element may be captured based on a second set of at least one capturing parameter. The second set of at least one capturing parameter may include, but is not limited to, a second distance with respect to the at least one crop, a second angle with respect to the at least one crop, a second focus, a second resolution, a second number of multimedia content elements to be captured, a second type of multimedia content element to be captured, or a combination thereof. The second set of at least one capturing parameter may include a respective subset of capturing parameters for each of two or more capturing devices (e.g., two cameras may be configured to capture images at different angles with respect to the at least one plant).

In a further embodiment, S360 includes determining the second set of at least one capturing parameter based on a type of the crops, one or more characteristics of the crops, both, and the like. To this end, each capturing parameter of the first set of at least one capturing parameter may be a predetermined parameter associated with the crop type, the crop characteristics, or a combination thereof.

In an embodiment, multimedia content elements captured using the second set of at least one capturing parameter provide a clearer view of at least a portion of the at least one crop and, accordingly, of at least one crop characteristic that acts as an indicator (i.e., a sign or symptom such as, e.g., an abnormal color, pests, holes in plants, an abnormal texture, etc.) of the suspected anomaly, as compared to the first set. To this end, the second distance may be less than the first distance (e.g., 50 feet if the first distance is 100 feet), the second focus may be higher than the first focus (e.g., 200% zoom if the first focus is 100% zoom), the second resolution may be higher than the first resolution (e.g., 2 MP if the first resolution is 1 MP), or a combination thereof.

In an embodiment, S360 further includes sending, to the capturing device, the second set of at least one capturing parameter, thereby causing the capturing device to capture the second set of at least one multimedia content element using the second set of at least one capturing parameter. The capturing device may be configured to store the captured second set of at least one multimedia content element in a data source.

At S370, the second set of at least one multimedia content element is analyzed. In an embodiment, S370 includes analyzing, via machine vision, each multimedia content element of the second set to identify a second set of at least one characteristic of the at least one crop and comparing the second set of at least one characteristic with the normal development data. In a further embodiment, the comparison may be further based on times of capture of each multimedia content element and times associated with the normal development data.

At S380, based on the analysis of the second set, it is determined whether development of the at least one plant is anomalous. In an embodiment, the development may be determined to be anomalous if the second set of at least one characteristic deviates from the normal development data. In a further embodiment, the second set of at least one characteristic may deviate from the normal development if, e.g., the results of the analysis of the second set are not within the predetermined normal thresholds, or if the results of the analysis otherwise differ from the normal development data above a predetermined threshold.

In a further embodiment, at least one anomaly indicator may be identified among the second set of at least one characteristic for the second set of at least one multimedia content element. The at least one anomaly indicator may include, but is not limited to, an abnormal color, pests, holes in plants, an abnormal texture, a combination thereof, and the like.

In an embodiment, S380 may further include identifying, based on the identified at least one anomaly indicator, at least one type of anomaly. The at least one type of anomaly may include, but is not limited to, a pest infestation, plant disease, improper supply of nutrients, and the like. The at least one type of anomaly may further be a more specific type of anomaly such as, but not limited to, infestation of a particular species of pest, a particular plant disease (e.g., blight), a cause of improper supply of nutrients (e.g., over watering, under watering, poor soil conditions, insufficient sunlight, etc.), and the like.

In an embodiment, S380 may also include generating a notification. The notification may indicate whether development of the at least one plant is anomalous, the at least one anomaly indicator, the at least one type of anomaly, or a combination thereof. In a further embodiment, the notification may be generated only when it is determined that development of the at least one plant is anomalous.

At S390, it is determined whether execution should continue and, if so, execution continues with S320; otherwise, execution terminates. In an embodiment, execution may proceed continuously, thereby allowing for continuous monitoring of the at least one plant to detect anomalies.

As a non-limiting example, normal development data indicating at least a normal color of leaves of an avocado tree is obtained. A RGB camera attached to a drone is caused to monitor the avocado tree. An image showing the avocado tree is received from the RGB camera. The image is captured when the drone (and, therefore, the RGB camera) is at a vertical distance of 50 feet directly above the avocado tree. The images of the first set of images are analyzed using machine vision to identify a first color of leaves of the monitored avocado tree. The identified first color is compared to the normal color. Based on the comparison, it is determined that the identified first color differs from the normal color above a predetermined threshold. Accordingly, a suspected anomaly is identified.

When the suspected anomaly is identified, the drone (and, therefore, the RGB camera) is caused to move to a vertical distance of 20 feet directly above the avocado tree and to capture a video of the avocado tree. The video is received from the RGB camera. The video is analyzed to identify a second color of the leaves of the avocado tree. The second color is compared to the normal color, and it is determined that the second color differs from the normal color above a predetermined threshold. Accordingly, it is determined that an anomaly has been identified. Further, it is determined that the second color is more yellow as compared to the normal color (green) such that the type of the anomaly is determined to be related to lack of nutrients.

Various embodiments disclosed herein can be utilized to efficiently determine anomalous behavior and, therefore, to efficiently identify anomalies in development. Specifically, such efficient determination typically results in faster identification of developmental anomalies at least due to the analysis of clearer views of the developing crops. Additionally, such determination may use fewer computing resources as compared to other solutions at least due to only analyzing such clearer views when warranted (e.g., when suspected anomalies are identified) rather than continuously or periodically monitoring the clearer view.

It should be noted that the embodiments disclosed herein are discussed with respect to a first set of multimedia content elements and a second set of multimedia content elements merely for simplicity purposes and without limitation on the disclosed embodiments. In some embodiments, further sets of multimedia content elements may be obtained and analyzed as needed to identify anomalies. In particular, some anomalies may be identified via, for example, smaller images of plants than other anomalies such that the degree of clarity needed may vary depending on the type of anomaly. As a non-limiting example, early symptoms of blight (e.g., small brown spots with rings on leaves) may be identified at lower resolution or focus images than signs of pest infestation (e.g., holes in leaves). Accordingly, different granularities of capturing parameters may be utilized.

It should be noted that various embodiments disclosed herein are described with respect to identification of anomalies in plants merely for simplicity purposes and without limitation on the disclosed embodiments. Some disclosed embodiments may be equally applied to identify anomalies based on monitoring of other crops such as, for example, fungi or bacterial colonies, without departing from the scope of the disclosure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for identifying developmental anomalies, comprising:
    obtaining a first set of at least one multimedia content element showing at least one crop, wherein the first set of at least one multimedia content element is captured using a first set of at least one capturing parameter;
    obtaining normal development data for the at least one crop, wherein the normal development data represents a plurality of normal development characteristics of the at least one crop, wherein the normal development data includes a plurality of times, each of the plurality of times representing a stage in crop development of the at least one crop, wherein each of the plurality of times is associated with at least one of the plurality of normal development characteristics;
    analyzing, via machine vision, the first set of at least one multimedia content element to identify a first set of at least one characteristic of the at least one crop, wherein the analysis of the first set of at least one multimedia content element is executed with respect to the plurality of times and the respective associated normal development characteristics;
    determining, based on the first set of at least one characteristic and the normal development data, whether a suspected anomaly is identified, wherein the suspected anomaly is identified when the first set of at least one characteristic deviates from the normal development data; and
    verifying if the suspected anomaly is an anomaly in development of the at least one crop using a second set of at least one multimedia content element, wherein the second set of at least one multimedia content element is captured using a second set of at least one capturing parameter.

2. The method of claim 1, further comprising:
    obtaining the second set of at least one multimedia content element, when it is determined that a suspected anomaly is identified;
    analyzing, via machine vision, the second set of at least one multimedia content element to identify a second set of at least one characteristic of the at least one crop; and
    identifying, based on the second set of at least one characteristic and the normal development data, the anomaly in development of the at least one crop, wherein the suspected anomaly is verified as the anomaly when the second set of at least one characteristic deviates from the normal development data.

3. The method of claim 2, wherein the normal development data includes at least one normal development rule, wherein the anomaly is identified when the second set of at least one characteristic does not meet the at least one normal development rule.

4. The method of claim 2, further comprising:
    determining, based on the second set of at least one characteristic and the normal development data, at least one anomaly indicator;
    determining, based on the at least one anomaly indicator, a type of the anomaly; and
    generating a notification, wherein the notification indicates the determined type of anomaly.

5. The method of claim 1, further comprising:
    determining, based on the second set of at least one characteristic and the normal development data, at least one anomaly indicator; and
    determining, based on the at least one anomaly indicator, a type of the anomaly.

6. The method of claim 1, wherein the first set of at least one capturing parameter includes a first distance between a capturing device and the at least one crop, wherein the second set of at least one capturing parameter includes a second distance between the capturing device and the at least one crop, wherein the second distance is less than the first distance.

7. The method of claim 1, wherein the first set of at least one capturing parameter includes a first resolution of a capturing device, wherein the second set of at least one capturing parameter includes a second resolution the capturing device, wherein the second resolution is higher than the first resolution.

8. The method of claim 1, wherein the normal development data includes at least one normal development multimedia content element, wherein identifying the anomaly further comprises:
    comparing the second set of at least one multimedia content element to the at least one normal development multimedia content element, wherein the anomaly is identified when the second set of at least one multimedia content element differs from the at least one normal development multimedia content element above a predetermined threshold.

9. A non-transitory computer readable medium having stored thereon instructions for causing a processing circuitry to execute a process, the process comprising:
    obtaining a first set of at least one multimedia content element showing at least one crop, wherein the first set of at least one multimedia content element is captured using a first set of at least one capturing parameter;

obtaining normal development data for the at least one crop, wherein the normal development data represents a plurality of normal development characteristics of the at least one crop, wherein the normal development data includes a plurality of times, each of the plurality of times representing a stage in crop development of the at least one crop, wherein each of the plurality of times is associated with at least one of the plurality of normal development characteristics;

analyzing, via machine vision, the first set of at least one multimedia content element to identify a first set of at least one characteristic of the at least one crop, wherein the analysis of the first set of at least one multimedia content element is executed with respect to the plurality of times and the respective associated normal development characteristics;

determining, based on the first set of at least one characteristic and the normal development data, whether a suspected anomaly is identified, wherein the suspected anomaly is identified when the first set of at least one characteristic deviates from the normal development data; and verifying if the suspected anomaly is an anomaly in development of the at least one crop using a second set of at least one multimedia content element, wherein the second set of at least one multimedia content element is captured using a second set of at least one capturing parameter.

10. A system for efficiently identifying developmental anomalies, comprising:

a processing circuitry; and a memory, the memory containing instructions that, when executed by the processing circuitry, configure the system to:

obtain a first set of at least one multimedia content element showing at least one crop, wherein the first set of at least one multimedia content element is captured using a first set of at least one capturing parameter;

obtain normal development data for the at least one crop, wherein the normal development data represents a plurality of normal development characteristics of the at least one crop, wherein the normal development data includes a plurality of times, each of the plurality of times representing a stage in crop development of the at least one crop, wherein each of the plurality of times is associated with at least one of the plurality of normal development characteristics;

analyze, via machine vision, the first set of at least one multimedia content element to identify a first set of at least one characteristic of the at least one crop, wherein the analysis of the first set of at least one multimedia content element is executed with respect to the plurality of times and the respective associated normal development characteristics;

determine, based on the first set of at least one characteristic and the normal development data, whether a suspected anomaly is identified, wherein the suspected anomaly is identified when the first set of at least one characteristic deviates from the normal development data; and verify if the suspected anomaly is an anomaly in development of the at least one crop using a second set of at least one multimedia content element, wherein the second set of at least one multimedia content element is captured using a second set of at least one capturing parameter.

11. The system of claim 10, wherein the system is further configured to:

obtain the second set of at least one multimedia content element, when it is determined that a suspected anomaly is identified;

analyze, via machine vision, the second set of at least one multimedia content element to identify a second set of at least one characteristic of the at least one crop; and identify, based on the second set of at least one characteristic and the normal development data, the anomaly in development of the at least one crop, wherein the suspected anomaly is verified as the anomaly when the second set of at least one characteristic deviates from the normal development data.

12. The system of claim 11, wherein the normal development data includes at least one normal development rule, wherein the anomaly is identified when the second set of at least one characteristic does not meet the at least one normal development rule.

13. The system of claim 11, wherein the system is further configured to:

determine, based on the second set of at least one characteristic and the normal development data, at least one anomaly indicator;

determine, based on the at least one anomaly indicator, a type of the anomaly; and generate a notification, wherein the notification indicates the determined type of anomaly.

14. The system of claim 10, wherein the system is further configured to:

determine, based on the second set of at least one characteristic and the normal development data, at least one anomaly indicator; and determine, based on the at least one anomaly indicator, a type of the anomaly.

15. The system of claim 10, wherein the first set of at least one capturing parameter includes a first distance between a capturing device and the at least one crop, wherein the second set of at least one capturing parameter includes a second distance between the capturing device and the at least one crop, wherein the second distance is less than the first distance.

16. The system of claim 10, wherein the first set of at least one capturing parameter includes a first resolution of a capturing device, wherein the second set of at least one capturing parameter includes a second resolution the capturing device, wherein the second resolution is higher than the first resolution.

17. The system of claim 10, wherein the normal development data includes at least one normal development multimedia content element, wherein the system is further configured to:

compare the second set of at least one multimedia content element to the at least one normal development multimedia content element, wherein the anomaly is identified when the second set of at least one multimedia content element differs from the at least one normal development multimedia content element above a predetermined threshold.

\* \* \* \* \*